United States Patent
Qiu et al.

(10) Patent No.: US 7,377,695 B2
(45) Date of Patent: May 27, 2008

(54) INTEGRAL DUPLEX BEARINGS FOR ROTATING X-RAY ANODE

(75) Inventors: Liangheng Qiu, Waukesha, WI (US); Thomas Dean Schaefer, Brookfield, WI (US); Paul M. Ratzmann, Fairview Height, WI (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 11/163,338

(22) Filed: Oct. 14, 2005

(65) Prior Publication Data

US 2007/0086689 A1    Apr. 19, 2007

(51) Int. Cl.
  *F16C 33/60*  (2006.01)
  *H01J 35/10*  (2006.01)
(52) U.S. Cl. .................. 384/504; 384/493; 384/905; 378/132
(58) Field of Classification Search ............. 384/493, 384/499, 504–506, 512, 517, 905; 378/132
  See application file for complete search history.

(56) References Cited

U.S. PATENT DOCUMENTS

| 2,216,888 | A | * | 10/1940 | Machlett | 378/132 |
| 2,230,857 | A | * | 2/1941 | Atlee | 384/506 |
| 2,813,210 | A | * | 11/1957 | Cummings et al. | 378/132 |
| 2,885,583 | A | * | 5/1959 | Zunick et al. | 384/535 |
| 4,569,070 | A | * | 2/1986 | Schubert et al. | 378/132 |
| 4,577,340 | A | * | 3/1986 | Carlson et al. | 378/132 |
| 4,949,368 | A | * | 8/1990 | Kubo | 384/507 |
| 6,379,040 | B1 | | 4/2002 | Hallman | |
| 6,418,192 | B1 | | 7/2002 | Ratzmann | |
| 6,456,693 | B1 | | 9/2002 | Ratzmann | |
| 6,636,583 | B2 | | 10/2003 | Ratzmann | |
| 2002/0085677 | A1 | | 7/2002 | Ratzmann | |
| 2002/0150212 | A1 | | 10/2002 | Ratzmann | |
| 2003/0165217 | A1 | | 9/2003 | Ratzmann | |

* cited by examiner

*Primary Examiner*—Thomas R Hannon

(57) ABSTRACT

An x-ray target assembly is provided comprising a drive shaft and an outer shaft housing element. A primary integral duplex bearing assembly is positioned between the outer shaft housing element and the drive shaft and comprises a primary fixed outer race and a primary dual inner race comprising a first primary inner race element and a second primary race element. A plurality of primary ball elements are positioned therebetween. A secondary integral duplex bearing assembly is positioned between the outer shaft housing element and the drive shaft and comprises a secondary floating outer race comprising a single secondary race element. A secondary dual inner race is comprised of a first secondary inner race element and a second secondary race element. A plurality of secondary ball elements are positioned between the secondary floating outer race and the secondary dual inner race.

20 Claims, 1 Drawing Sheet

INTEGRAL DUPLEX BEARINGS FOR ROTATING X-RAY ANODE

TECHNICAL FIELD

The present invention relates generally to an x-ray target assembly and more particularly to an x-ray target assembly with integral duplex bearings for rotation.

BACKGROUND OF THE INVENTION

Modern medical imaging assemblies have increased in complexity and capabilities. These increases often result in an increase in power requirements and associated wear resistance on such assemblies. Such is the case with x-ray tube assemblies. Running in an environment of high temperature and high vacuum, x-ray tube bearings with traditional configurations such as solid lubricant often suffer from failure due to wear.

Within the bearings, the race wear is commonly determined by the contact stress, contact SV value, and heat generate rate between the contact of the raceway and the ball. Current bearing designs often reach capacity limits despite a market driven goal of longer tube life. Bearing design, therefore, must turn to new alternatives that allow for increase tube capacity and/or increased lifespan.

Additionally, conventional bearings often require complicated assembly methods and often fail to thermally compensate for the temperature extremes of an x-ray tube environment. Therefore, usage of traditional off-shelf bearing assemblies generates complex and costly issues regarding assembly and performance.

It would, therefore, be highly desirable to have an x-ray tube bearing assembly that allowed for simple and cost effective assembly. It would also be highly beneficial to have an x-ray tube bearing assembly that would thermally compensate for the temperature extremes of the x-ray tube environment.

SUMMARY OF THE INVENTION

An x-ray target assembly is provided comprising a drive shaft and an outer shaft housing element. A primary integral duplex bearing assembly is positioned between the outer shaft housing element and the drive shaft and comprises a primary fixed outer race and a primary dual inner race comprising a first primary inner race element and a second primary race element. A plurality of primary ball elements are positioned there between. A secondary integral duplex bearing assembly is positioned between the outer shaft housing element and the drive shaft and comprises a secondary floating outer race comprising a single secondary race element. A secondary dual inner race is comprised of a first secondary inner race element and a second secondary race element. A plurality of secondary ball elements are positioned between the secondary floating outer race and the secondary dual inner race Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
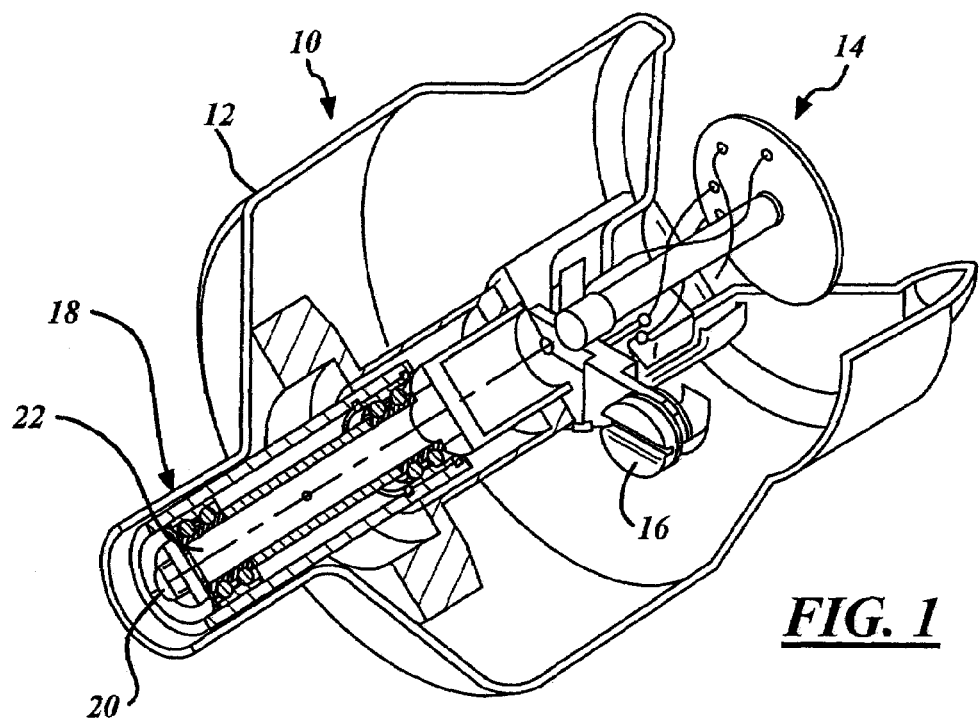
FIG. 1 is an illustration of an x-ray tube assembly in accordance with the present invention.
Figure 2:
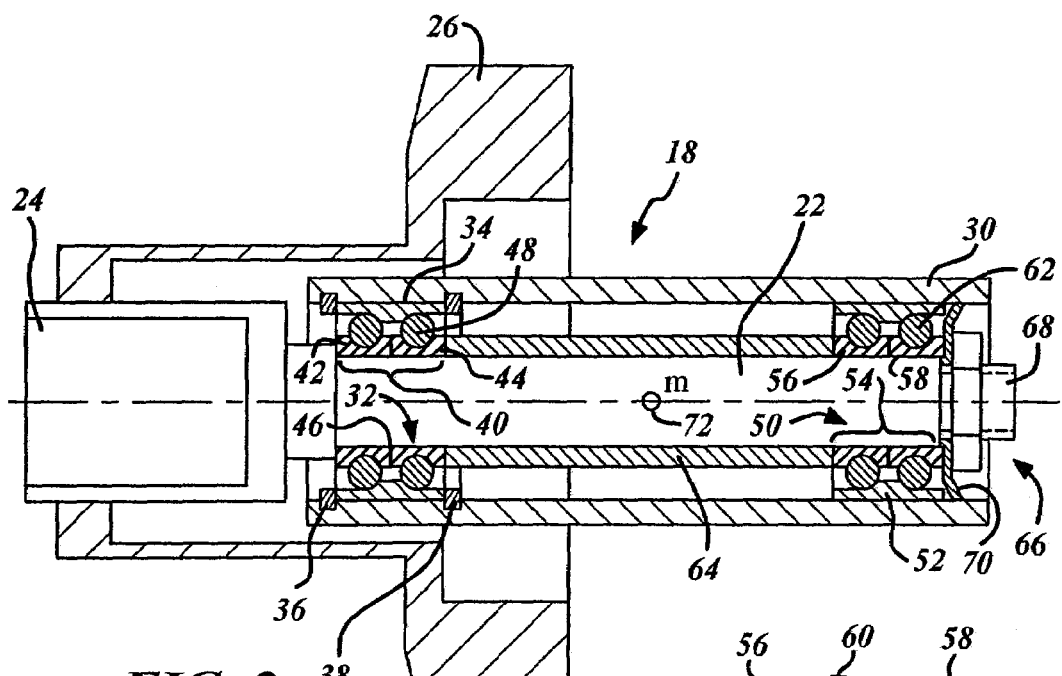
FIG. 2 is a cross-sectional illustration of an x-ray tube target assembly shown in FIG. 1.
Figure 3:
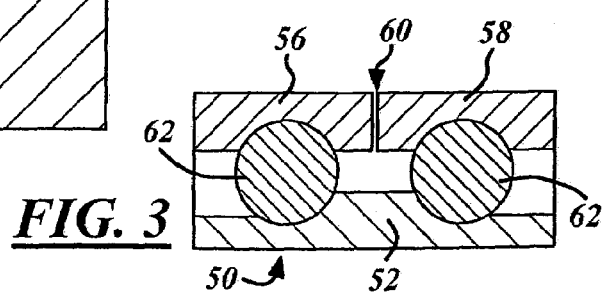
FIG. 3 is a detail illustration of a portion of a bearing assembly shown in FIG. 2.

Referring now to FIG. 1, which is an illustration of an x-ray tube assembly 10 in accordance with the present invention. The assembly 10 includes a tube casing 12. A variety of tube casings 12 are contemplated by the present invention. Within the tube casing 12 are a cathode assembly 14 wherein electrons are gathered and discharged through a cathode discharge cup 16 towards an anode assembly 18. The anode assembly 18 (or target assembly) is comprised of an anode drive assembly 20 rotating a drive shaft 22 which in turn rotates a center hub element 24 and target element 26. As is well known in x-ray tube art, the electrons generated by the cathode assembly 14 impact the x-ray tube target element 26 and result in the production of gamma or x-rays.

Of particular interest of the present invention, however, is the anode assembly 18 and specifically the drive shaft 22. The drive shaft 22 rotates within an outer shaft housing element 30. The production of gamma or x-rays at the x-ray tube target element 26 results in considerable thermal energy being transferred to the drive shaft 22. This thermal energy transfer additionally results in thermal expansion of the drive shaft 22 within its outer shaft housing element 30. This generates considerable wear and life issues on the use of standard bearing assemblies. The present invention, however, utilizes a unique bearing arrangement and design to improve the thermal capacity and life span of the x-ray tube assembly.

The present invention includes a primary or forward bearing assembly 32 that is positioned between the outer shaft housing element 30 and the drive shaft 22. The primary or forward bearing assembly 32 is an integral duplex bearing assembly. Although terms such as forward and primary are utilized, it should be understood that alternate configurations may be obvious in light of the present disclosure. The primary or forward bearing assembly 32 includes a primary or forward fixed outer race 34 positioned adjacent the outer shaft housing element 30. Although the primary or forward fixed outer race 34 may be fixed in position adjacent the outer shaft housing element 30 in a variety of fashions, one embodiment contemplates the use of a first lock ring 36 and a second lock ring 38 that prevent axial movement of the primary or forward fixed outer race 34. The primary or forward fixed outer race 34 is formed as a single race element and not as a multi-race element.

The primary or forward bearing assembly 32 further includes a primary or forward dual inner race 40 positioned adjacent the drive shaft 22. Unlike the primary or forward fixed outer race 34, it is contemplated that the primary or forward dual inner race 40 may incur some movement along the drive shaft 22. In one embodiment, it is contemplated that the primary or forward dual inner race 40 be slip-fitted against the drive shaft 22 to allow movement of the drive shaft 22 due to thermal expansion. The primary or forward dual inner race 40 is comprised of a first primary or forward inner race element 42 and a second primary or forward inner race element 44. These two inner race elements 42, 44 preferably do not contact each other such that a primary or forward axial gap 46 is formed there between. The axial gap 46 allows for an adapted capacity for varied contact angles of the plurality of primary or forward ball elements 48 positioned between the primary or forward dual inner race 40 and the primary or forward fixed outer race 34 that occur during thermal expansion.

The present invention further includes a secondary or rear bearing assembly 50 that is also positioned between the outer shaft housing element 30 and the drive shaft 22 remotely from the primary or first bearing assembly 32. The secondary or rear bearing assembly 50 is an integral duplex bearing assembly. Although terms such as secondary and rear are utilized, it should be understood that alternate configurations may be obvious in light of the present disclosure. The secondary or rear bearing assembly 50 is comprised of a secondary or rear floating outer race 52 that slidably engages the outer shaft housing element 30 such that it may travel axially along the outer shaft housing element 30 to compensate for thermal expansion. The secondary or rear floating outer race 52 is preferably formed as a single race element and not as a multi-race element.

The secondary or rear bearing assembly 50 additionally includes a secondary or rear dual inner race 54 positioned adjacent the drive shaft 22. It is contemplated that the secondary or rear dual inner race 54 may incur some movement along the drive shaft 22. In one embodiment, it is contemplated that the secondary or rear dual inner race 54 be slip-fitted against the drive shaft 22 to allow movement of the drive shaft 22 due to thermal expansion. The secondary or rear dual inner race 54 includes a first secondary or rear inner race element 56 and a second secondary or rear inner race element 58. These two inner race elements 56,58 preferably do not contact each other such that a secondary or rear axial gap 60 is formed there between. The axial gap 60 allows for an adapted capacity for varied contact angles of the plurality of secondary or rear ball elements 62 positioned between the secondary or rear dual inner race 54 and the secondary or rear floating outer race 52 that occur during thermal expansion.

In one embodiment of the present invention, it is contemplated that a drive shaft spacer element 64 may be positioned between the primary or front dual inner race 40 and the secondary or rear dual inner race 54. The drive shaft spacer element 64 is preferably slidable along the drive shaft 22 and is preferably in communication with both inner races 40,54 simultaneously. This allows a preload assembly 66 to generate a preload force on the primary or front bearing assembly 32 and the secondary or rear bearing assembly 50 by loading only a single end (preferably the secondary or rear bearing assembly 50). Although it is contemplated that this may be accomplished in a variety of fashions, one embodiment contemplates the use of a bolt assembly 68 in communication with the drive shaft 22 and a leaf spring 70 positioned between the drive shaft 22 and bolt assembly 68. By adjusting the bolt assembly 68, a varied pre-tension load may be applied through the leaf spring 70 and into the secondary or rear bearing assembly 50. It is further contemplated that the primary or front and secondary or rear bearing assemblies 32,50 are positioned at equal distances from the center of mass 72 of the drive shaft 22.

While particular embodiments of the invention have been shown and described, numerous variations and alternative embodiments will occur to those skilled in the art. Accordingly, it is intended that the invention be limited only in terms of the appended claims.

What is claimed is:

1. An x-ray target assembly comprising:
   a center hub element affixed to a drive shaft;
   an outer shaft housing element;
   a forward bearing assembly positioned between said outer shaft housing element and said drive shaft, said forward bearing assembly comprising:
     a forward fixed outer race positioned adjacent said outer shaft housing element, said forward fixed outer race comprising a single forward race element;
     a forward dual inner race comprising a first forward inner race element and a second forward inner race element; and
     a plurality of forward ball elements positioned between said forward fixed outer race and said forward dual inner race;
   a rear bearing assembly positioned between said outer shaft housing element and said drive shaft, said rear bearing assembly comprising:
     a rear floating outer race positioned adjacent said outer shaft housing element, said rear floating outer race comprising a single rear race element;
     a rear dual inner race comprising a first rear inner race element and a second rear inner race element; and
     a plurality of rear ball elements positioned between said rear floating outer race and said rear dual inner race; and
   a target element mounted to said center hub element.

2. An x-ray target assembly as described in claim 1, further comprising:
   a rear axial gap positioned between said first rear inner race element and said second rear inner race element; and
   a forward axial gap positioned between said first forward inner race element and said second forward inner race element.

3. An x-ray target assembly as described in claim 1, wherein said forward bearing assembly and said rear bearing assembly comprise integral duplex bearing assemblies.

4. An x-ray target assembly as described in claim 1, wherein said forward dual inner race and said rear dual inner race are slip-fit onto said drive shaft to allow for thermal compensation.

5. An x-ray target assembly as described in claim 4, further comprising a drive shaft spacer element mounted to said drive shaft and positioned between said forward dual inner race and said rear dual inner race.

6. An x-ray target assembly as described in claim 5, further comprising a preload assembly axially preloading said forward dual inner race, said rear dual inner race and said drive shaft spacer element into axial compression.

7. An x-ray target assembly as described in claim 6, wherein said preload assembly comprises:
   a bolt assembly attached to said drive shaft; and
   a leaf spring assembly positioned between said bolt assembly and said drive shaft, said leaf spring assembly transferring load from said bolt assembly to said rear dual inner race.

8. An x-ray target assembly as described in claim 1, wherein said drive shaft experiences thermal expansion during usage, and said rear floating outer race slides along said drive shaft to accommodate said thermal expansion.

9. An x-ray target assembly as described in claim 1, wherein said drive shaft comprises a super nickel alloy.

10. An x-ray target assembly as described in claim 1, wherein said forward dual inner race and said read dual inner race are configured to allow for a plurality of contact angles during thermal expansion of said drive shaft.

11. An x-ray target assembly comprising:
    a drive shaft;
    an outer shaft housing element;

a primary integral duplex bearing assembly positioned between said outer shaft housing element and said drive shaft, said primary integral duplex bearing assembly comprising:
- a primary fixed outer race positioned adjacent said outer shaft housing element, said primary fixed outer race comprising a single primary race element;
- a primary dual inner race comprising a first primary inner race element and a second primary inner race element; and
- a plurality of primary ball elements positioned between said primary fixed outer race and said primary dual inner race;

a secondary integral duplex bearing assembly positioned between said outer shaft housing element and said drive shaft, said secondary integral duplex bearing assembly comprising:
- a secondary floating outer race positioned adjacent said outer shaft housing element, said secondary floating outer race comprising a single secondary race element;
- a secondary dual inner race comprising a first secondary inner race element and a second secondary inner race element; and
- a plurality of secondary ball elements positioned between said secondary floating outer race and said secondary dual inner race.

12. An x-ray target assembly as described in claim 11, further comprising:
- a secondary axial gap positioned between said first secondary inner race element and said second secondary inner race element; and
- a primary axial gap positioned between said first primary inner race element and said second primary inner race element.

13. An x-ray target assembly as described in claim 11, wherein said primary dual inner race and said secondary dual inner race are slip-fit onto said drive shaft to allow for thermal compensation.

14. An x-ray target assembly as described in claim 11, further comprising a drive shaft spacer element mounted to said drive shaft and positioned between said primary dual inner race and said secondary dual inner race.

15. An x-ray target assembly as described in claim 11, further comprising:
- a drive shaft spacer element mounted to said drive shaft and positioned between said primary dual inner race and said secondary dual inner race; and
- a preload assembly axially preloading said primary dual inner race, said secondary dual inner race and said drive shaft spacer element into axial compression.

16. An x-ray target assembly as described in claim 15, wherein said preload assembly comprises:
- a bolt assembly attached to said drive shaft; and
- a leaf spring assembly positioned between said bolt assembly and said drive shaft, said leaf spring assembly transferring load from said bolt assembly to said secondary dual inner race.

17. An x-ray target assembly as described in claim 11, wherein said drive shaft experiences thermal expansion during usages, and said secondary floating outer race slides along said drive shaft to accommodate said thermal expansion.

18. A method of constructing an x-ray target assembly comprising:
- assembling a drive shaft within an outer shaft housing element;
- positioning a primary bearing assembly between said outer shaft housing element and said drive shaft such that:
  - a primary fixed outer race is fixedly positioned adjacent said outer shaft housing element;
  - a primary dual inner race comprising a first primary inner race element and a second primary inner race element positioned adjacent said drive shaft; and
  - a plurality of primary ball elements are positioned between said primary fixed outer race and said primary dual inner race;
- positioning a secondary bearing assembly between said outer shaft housing element and said drive shaft such that:
  - a secondary floating outer race is slidably positioned adjacent said outer housing element;
  - a secondary dual inner race comprising a first secondary inner race element and a second secondary inner race element is positioned adjacent said drive shaft; and
  - a plurality of secondary ball elements are positioned between said secondary floating outer race and said secondary dual inner race;
- wherein said secondary floating outer races allows said secondary bearing assembly to compensate for thermal expansion of said drive shaft.

19. A method as described in claim 18, further comprising preloading said secondary bearing assembly axially.

20. A method as described in claim 18, further comprising positioning said first secondary inner race element and said second secondary inner race element such that a secondary axial gap is created inbetween.

* * * * *